Patented Jan. 30, 1945

2,368,337

UNITED STATES PATENT OFFICE 2,368,337

SUBSTITUTED BARBITURIC ACIDS AND SALTS THEREOF

Lewis A. Walter and Louis H. Goodson, East Orange, N. J., assignors to The Maltbie Chemical Company, Newark, N. J., a corporation of New Jersey No Drawing. Application April 23, 1943, Serial No. 484,315

18 Claims. (Cl. 260—257)

The present invention relates to certain new and useful chemical compounds, viz. 5,5 disubstituted barbituric acid derivatives, and their salts, having the formula:

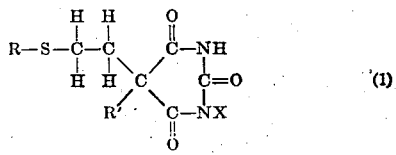

wherein R and R' are hydrocarbon groups, either saturated or unsaturated, and either the same or different, and each of which contains not more than six carbon atoms, and wherein the sum of the carbon atoms in R and R' does not exceed 10, it being understood that R has a carbon atom attached directly to the sulfur of the beta thioethyl group

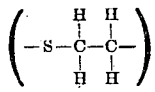

and R' has a carbon atom attached directly to the carbon atom forming the barbituric acid nucleus; and wherein X is a member of a group consisting of hydrogen, alkali-metal, an equivalent of alkaline-earth metal, ammonium, monoalkyl ammonium, dialkyl ammonium, alkanol ammonium and an equivalent of alkylene diammonium.

These novel compounds, and their salts, which form the subject-matter of the present invention, when tested pharmacologically, have been found to possess useful hypnotic or sedative properties, making them valuable for various medical purposes. They are, in general, white, crystalline solids.

The novel compounds according to our invention may be prepared by condensing a disubstituted malonic ester with urea in the presence of sodium ethylate, in an organic solvent such as, for example, absolute alcohol, as is illustrated by the following equation:

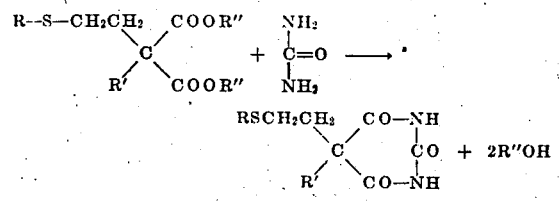

wherein R and R' have the significance stated above and R" is a lower alkyl group.

The disubstituted malonic ester may be prepared readily by condensing beta chloroethyl sulfides with sodio-monoalkyl malonic esters, preferably in an inert solvent such as toluene or benzene, as illustrated by the following equation:

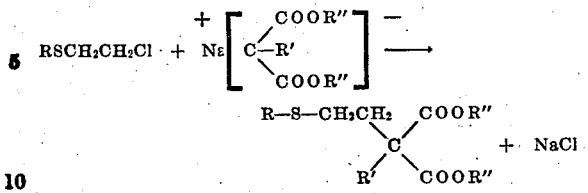

Salts of the compounds may be prepared as hereafter described.

The following specific examples are illustrative of the novel compounds according to our invention, and of suitable methods for their preparation.

EXAMPLE 1

*5-β-n-butylthioethyl-5-ethyl barbituric acid*

To 1.1 moles of metallic sodium, dissolved in 500 cc. of absolute alcohol, 0.5 mole of β-n-butylthioethyl ethyl malonic ester (boiling point 135–140° C. at 2 mm. pressure) and 0.6 mole of urea are added. This mixture is refluxed on a steam bath for 12 hours, the alcohol is removed by vacuum distillation and the residue is dissolved in about 600 cc. of water. The aqueous solution is then extracted with ether and the aqueous layer is separated and acidified with acetic acid. The resulting precipitate of 5-β-n-butylthioethyl-5-ethyl barbituric acid is filtered off and purified by crystallization from alcohol. The compound has a melting point of approximately 75–77° C. (uncorrected), and is represented by the formula:

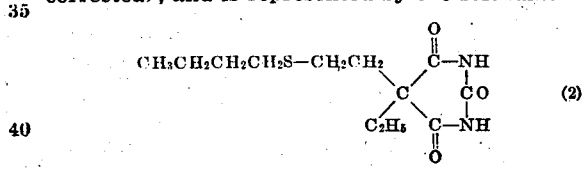

EXAMPLE 2

*5-β-n-butylthioethyl-5-isopropyl barbituric acid*

This compound is prepared from a solution of 1.1 moles of sodium in 500 cc. of absolute alcohol, 0.5 mole of β-n-butylthioethyl isopropyl malonic ester (boiling point 130–133° C. at 1.5 mm.) and 0.6 mole of urea in the same manner described in Example 1. The crude product is purified by crystallization from alcohol and has a melting point of approximately 89–90° C. uncorrected. It is represented by the formula:

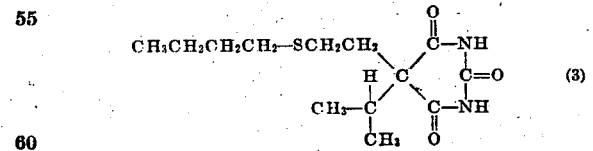

EXAMPLE 3

5-β-(1-methylbutyl)-thioethyl-5-ethyl barbituric acid

This compound is prepared from a solution of 1.1 moles of sodium in 500 cc. of absolute alcohol, 0.5 mole of β-(1-methylbutyl)-thioethyl ethyl malonic ester (boiling point 135–140° C. at 1.5 mm.) and 0.6 mole of urea in the same manner described in Example 1. The crude product is purified by crystallization from alcohol and has a melting point of approximately 91–94° C. uncorrected. It is represented by the formula:

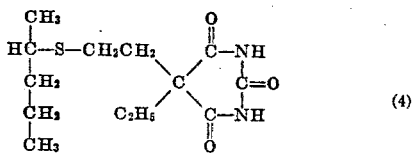

(4)

EXAMPLE 4

5-β-ethylthioethyl-5-allyl barbituric acid

This compound is prepared from a solution of 1.1 moles of sodium in 500 cc. of absolute alcohol, 0.5 mole of β-ethylthioethyl allyl malonic ester (boiling point 135–140° C. at 2.5 mm.) and 0.6 mole of urea in the same manner described in Example 1. The crude product is purified by crystallization from alcohol and has a melting point of approximately 96.5–98° C. uncorrected. It is represented by the formula:

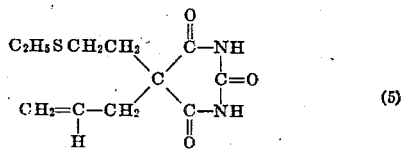

(5)

In the preparation of the novel barbituric acid derivatives and their salts according to our invention, we have discovered that the substituent groups R and R', as described and defined above, may be varied considerably, within those limits, while producing good results and useful and valuable compounds; and among the derivatives specifically included in the invention are the following illustrative examples of our novel derivatives, including the specific compounds previously described, and which, when tested pharmacologically, were found to possess valuable and useful properties as hypnotics or sedatives:

Barbituric acid $$RSCH_2CH_2 \diagdown C \diagup CO-NH \diagdown CO \diagup CO-NH$$

| wherein: R is— | R' is— | Approximate melting point °C. |
|---|---|---|
| Ethyl | Allyl | 96.5–98 |
| Do | Isoamyl | 116–117 |
| Allyl | n-Butyl | 101.5–102.5 |
| n-Butyl | Ethyl | 75–77 |
| Do | Isopropyl | 89–90 |
| Do | Allyl | oil |
| n-Amyl | Ethyl | 83–84 |
| 1-methylbutyl | do | 91–94 |

In the foregoing examples, the melting points are approximate and uncorrected; but are those which we actually observed, according to a procedure believed to be reliable.

SALTS OF THE NOVEL BARBITURIC ACID DERIVATIVES

Sodium salts of the barbituric acids described above may be prepared by dissolving 1 mole of the disubstituted barbituric acid in the minimum quantity of hot absolute alcohol and adding a solution containing one equivalent of sodium in absolute alcohol. On cooling, or on evaporation of the alcohol, the sodium salt separates as crystals, or in amorphous form. In some instances a syrup results and this material, when stirred with dry ether, gives the sodium salt in amorphous form.

Other alkali-metal salts may also be prepared by a similar procedure, using the appropriate metal.

The sodium salts of our novel barbituric acid derivatives have been found to be readily soluble in water, and their aqueous solutions are alkaline in reaction. When administered orally or hypodermically in proper dosage they are good and useful hypnotics or sedatives, and range in duration of action from long to ultra short acting.

Calcium salts of our novel compounds may be prepared by treating an absolute alcohol solution of the corresponding sodium salt with the metathetical amount of alcoholic calcium chloride, filtering off the precipitated sodium chloride and concentrating the alcoholic solution to yield the calcium salt.

The ammonium, alkyl and alkanol ammonium salts of our novel compounds may be prepared by dissolving the corresponding barbituric acid in an excess of ammonia or amine and subsequently removing the excess quantity of base.

In the following claims it is to be understood that "barbituric acid derivative" or similar expressions, includes, also, the salts of such derivatives, such as, for example, the salts of our novel compounds as described above.

The examples given above, and illustrative processes for their production, include the best embodiments of our present invention now known to us; but it is to be understood that the invention is not necessarily or specifically limited thereto and may, under proper conditions, have other embodiments, produced in other ways, without departure from the spirit of the invention, and within the scope of the following claims.

What we claim is:

1. As a new and useful chemical compound, a 5,5 disubstituted barbituric acid derivative having the formula:

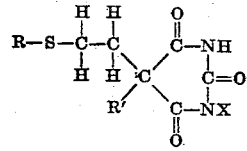

wherein R and R' are hydrocarbon groups, each of which contains not more than six carbon atoms, and wherein the sum of the carbon atoms in R and R' does not exceed 10, R has a carbon atom attached directly to the sulfur of the beta thioethyl group

and R' has a carbon atom attached directly to the carbon atom forming the barbituric acid nucleus; and wherein X is a member of a group consisting of hydrogen, alkali-metal, an equivalent of alkaline-earth metal, ammonium, monoalkyl ammonium, dialkyl ammonium, alkanol ammonium, and an equivalent of alkylene diammonium.

2. A compound according to claim 1 in which at least one of the R and R' groups is a primary hydrocarbon group.

3. A compound according to claim 1 in which X represents hydrogen.

4. A compound according to claim 1 in which R and R' are both primary hydrocarbon groups.

5. A compound according to claim 1 in which R and R' are both primary hydrocarbon groups and X represents hydrogen.

6. A compound according to claim 1 wherein R is a primary hydrocarbon group containing five carbon atoms and R' is a primary hydrocarbon group.

7. A compound according to claim 1 wherein R is a primary hydrocarbon group containing five carbon atoms, R' is a primary hydrocarbon group and X represents hydrogen.

8. A compound according to claim 1 wherein R is a primary hydrocarbon group, containing five carbon atoms and R' is an ethyl group.

9. A compound according to claim 1 wherein R is a primary hydrocarbon group containing five carbon atoms, R' is an ethyl group and X represents hydrogen.

10. A compound according to claim 1 wherein R is a primary hydrocarbon group and R' is a secondary hydrocarbon group.

11. A compound according to claim 1 wherein R is a primary hydrocarbon group, R' is a secondary hydrocarbon group and X represents hydrogen.

12. A compound according to claim 1 wherein R is a primary hydrocarbon group containing four carbon atoms and R' is a secondary hydrocarbon group.

13. A compound according to claim 1 wherein R is a primary hydrocarbon group containing four carbon atoms, R' is a secondary hydrocarbon group and X represents hydrogen.

14. A compound according to claim 1 wherein R is a secondary hydrocarbon group and R' is a primary hydrocarbon group.

15. A compound according to claim 1 wherein R is a secondary hydrocarbon group, R' is a primary hydrocarbon group and X represents hydrogen.

16. 5 - $\beta$ - n - amylthioethyl-5-ethyl barbituric acid.

17. 5-$\beta$-n-butylthioethyl-5-isopropyl barbituric acid.

18. 5-$\beta$-(1-methylbutyl)-thioethyl-5-ethyl barbituric acid.

LEWIS A. WALTER.
LOUIS H. GOODSON.